United States Patent
Costa et al.

(10) Patent No.: US 6,852,300 B2
(45) Date of Patent: Feb. 8, 2005

(54) PROCESS FOR PREPARING SILICA OR SILICA-BASED THICK VITREOUS FILMS ACCORDING TO THE SOL-GEL TECHNIQUE AND THICK FILMS THEREBY OBTAINED

(75) Inventors: Lorenzo Costa, Sommo (IT); Pier Paolo Costa, Sommo (IT); Stefania Grandi, Tornaco (IT)

(73) Assignee: Novara Technology S.r.l., Novara (IT)

( * ) Notice: Subject to any disclaimer, the term of this patent is extended or adjusted under 35 U.S.C. 154(b) by 0 days.

(21) Appl. No.: 10/359,738

(22) Filed: Feb. 7, 2003

(65) Prior Publication Data

US 2003/0180548 A1 Sep. 25, 2003

Related U.S. Application Data

(62) Division of application No. 09/786,682, filed on May 4, 2001, which is a division of application No. PCT/IT99/00284, filed on Sep. 6, 1999, now Pat. No. 6,562,408.

(30) Foreign Application Priority Data

Sep. 9, 1998 (IT) .......................................... NO98A0004

(51) Int. Cl.[7] .......................... C01B 33/00; B32B 17/06

(52) U.S. Cl. ..................... 423/338; 423/326; 423/327.1; 423/349; 501/53; 428/426; 428/446; 428/213; 428/697; 428/702

(58) Field of Search .............................. 423/326, 327.1, 423/338, 349; 501/53; 428/446, 426, 213, 697, 702

(56) References Cited

U.S. PATENT DOCUMENTS

| 4,801,318 | A |   | 1/1989 | Toki et al. |
| 4,810,415 | A | * | 3/1989 | Winkelbauer et al. . 252/183.13 |
| 4,966,812 | A |   | 10/1990 | Ashley et al. |
| 5,047,369 | A |   | 9/1991 | Fleming et al. |

FOREIGN PATENT DOCUMENTS

JP          2-33888         2/1990

* cited by examiner

*Primary Examiner*—Deborah Jones
*Assistant Examiner*—Ling Xu
(74) *Attorney, Agent, or Firm*—Smith, Gambrell & Russell, LLP

(57) ABSTRACT

A sol-gel process allowing preparation, on a substrate, of glassy films of silicon oxide or mixed oxides based on silicon oxide, of thickness above 1 micrometer, generally between 2 and 20 micrometers and characterized by absence of defects, that turn out to be particularly suitable as waveguides in flat optical devices.

12 Claims, 4 Drawing Sheets

PROCESS FOR PREPARING SILICA OR SILICA-BASED THICK VITREOUS FILMS ACCORDING TO THE SOL-GEL TECHNIQUE AND THICK FILMS THEREBY OBTAINED

This is a divisional of U.S. patent application Ser. No. 09/786,682, filed on May 4, 2001, now U.S. Pat. No. 6,562,408 which is a 371 of PCT/IT99/00284, filed on Sep. 6, 1999, which in turn claims priority to Italian Application NO98A 000004, filed on Sep. 9, 1998.

1. Field of the Invention

The present invention relates to a sol-gel process for the preparation of thick glassy films of silicon oxide or based on silicon oxide and to the thick films thus obtained.

In the technology of solid state, with the term "film" is meant a thin layer of a material having a thickness generally comprised between a few tens of nanometers (nm) and a few tens of micrometers μm, said layer being supported over a substrate of another material, generally of flat geometry.

The term "thick" typically refers to films of thickness larger than 1 μm.

Thick glassy films, deposited over a suitable substrate, are the object of extensive research in view of their foreseen se in the field of telecommunications, particularly telecommunications on optical and electro-optical cables.

In the past, telephone communications and data transmissions were realised transforming the signal into electronic impulses that were transmitted by means of cables of an electrically conductive material, generally copper.

Nowadays, in particular for the long distances, transmissions on electrical cables have been almost completely replaced by transmissions on optical fibers. As known, the optical fibers are glassy fibers whose structure comprises at least a central part, called nucleus, and an outer part, called mantle, made of glasses having slightly different chemical compositions; the different chemical composition gives rise to a difference in the refractive index of the two materials that allows confining the optical signal in the nucleus. Commonly the mantle is made of pure silicon oxide, whilst the nucleus is made of a mixed oxide based on silicon oxide containing from a few percent to about 10% by mole of different oxides such as germanium oxide.

The optical fibers offer several advantages over electrical cables as means for information transmission, such as a lower level of noise and lower signal attenuation as well as a higher amount of information transmitted per unit time, resulting in a higher transmission rate.

Despite these advantages, it has not been possible so far to fully exploit the potentiality of optical communications: in fact, a complete communication system requires devices for processing signals, for instance for transforming voice into signal at the two ends of the cable in telephonic transmissions, or for amplifying the signal along the fibre, that is rendered necessary due to unavoidable attenuation of the same signal. More generally, the so-called operation of signal commutation that is needed for delivering the same signal in the network requires suitable devices.

To this end, traditional electrical devices (electronic switches) are presently used, and generally any operation on the signal requires a conversion into electrical signal followed by a possible further conversion back to optical signal. In these operations time and signal quality are lost. As a consequence, a strong need is felt for optical or electro-optical devices capable of guiding an optical signal as well as of performing on it commuting operations comparable to those operated by electronic device on electrical signals.

The main features that optical devices must have are:

material of very high transmittance, requiring absence of inclusions and mechanical defects;

possibility of controlling through chemical composition the refractive index, that must be at least a few percent units higher than that of surrounding materials;

flat geometry, for easy fit into automated production lines;

thickness of a few μm, preferably between about 2 and 20 μm.

In order to ease integration of these devices into production and communication lines, the substrate should preferably be made of silicon or silicon oxide.

2. Background of the Invention

Such devices are presently produced according to physical techniques, among which thermal oxidation of silicon, and those known as Sputtering, Chemical Vapor Deposition and Flame Hydrolysis can be cited. Another method consists in the vacuum deposition on a silicon substrate of microparticles of silicon oxide obtained according to the Flame Hydrolysis technique.

However, these productions are complex, requiring costly working chambers and tools; some of these, such as silicon thermal oxidation, have a limit in the film thickness that can be obtained, while others are exceedingly slow and are often characterised by low productivity and too high costs, so as not to allow an actual industrial exploitation of optical devices.

The most economically promising technology for massive production of glassy films on substrates is sol-gel. Under the name sol-gel are gathered different procedures for the preparation of oxides of one or more elements in form of porous bodies ceramics or glasses.

While differing from each other in the specific details, all sol-gel procedures share the following phases:

preparation of a "sol", a solution or suspension in water, alcohol or hydroalcoholic mixtures of precursors of the elements whose oxide is to be prepared. Generally used as precursors are the alkoxides, of formula $M(OR)_n$, where M represents the element whose oxide is desired, the group —OR is the alkoxide moiety, and n represents the valence of element M; soluble salts of the element M, such as chlorides, nitrates and exceptionally oxides, may be used in place of alkoxides. During this phase the precursors begin to hydrolyse, that is, alkoxide moieties or other anion bonded to element M are replaced by —OH groups;

sol gelation, requiring from a few seconds up to some days, depending on chemical composition and temperature of the solution; during this phase hydrolysis of the possibly remaining precursor is completed and condensation occurs, consisting in the reaction of —OH groups belonging to different molecules with formation of one free water molecule and an oxygen bridge between atoms M, M' (alike or different), according to the reaction:

$$(HO)_{n-1}M-OH+HO-M'(OH)_m => (HO)_nM-O-M'(OH)_m+H_2O \quad (1)$$

The product obtained in this phase is called alcogel, hydrogel depending on the cases, or more generally "gel" as widely used in the English literature.

gel drying; in this phase the solvent is removed by simple evaporation or through hypercritical transformation into gas inside an autoclave; there is obtained an extremely porous dry body, that may have an apparent density ranging from about 10% to about 50% of the theoretical density of the oxide of that composition;

dry gel densification by thermal treating at a temperature generally comprised between 800° C. and 1200° C. depending on the gel chemical composition and on the parameters of the previous process phases; in this phase the porous gel densifies obtaining a glassy or ceramic compact oxide of theoretical density, with a linear shrinkage of about 50%.

If gelation phase is not too fast, it is possible to lay a liquid film of sol on a substrate, eventually resulting in a oxide supported film. Obtaining a oxide film on a substrate in this way is however easily feasible only for a thickness up to some tenths of micrometer. Up to such values of thickness, cohesive forces in the film are weak, and forces adhering the film on the substrate prevail, so that during the densification phase there is not in-plane shrinkage of the film and densification only involves its thickness decrease. At values of thickness above one micrometer, on the other hand, inner cohesive forces of the film become prevailing and during densification in-plane shrinking of the film takes place as well: the result is film fragmentation into "islands" spread over the substrate surface and poor adhesion of the film to the substrate.

This thickness of about 1 µm represents a technological limit for sol-gel technique, as indicated for instance in "SOL-GEL science: the physics and chemistry of SOL-GEL processing", Brinker and Scherer, Academic Press, 1990, a comprehensive review of the knowledge in the field. As already stated above, films prepared in this way are defined thin or thick when they have a thickness below or above about 1 µm, respectively.

For the production of thick films through the sol-gel technique it has been proposed to prepare a sol containing, in addition to normal precursors, a dense material in the form of nanospheres, that is, spheres of dimensions of about 10 nm. This approach is exposed in the paper "SOL-GEL derived thick coatings and their thermomechanical and optical properties", Menning et al., SPIE Vol. 1758, SOL-GEL Optics 11 (1992), pages 125–134. This technique however can hardly be implemented practically; besides, despite the fact that the first papers on the technique were published more then five years ago, actual feasibility of thick films by this route has not been proven yet.

Another proposed approach is to prepare thick films through repeated depositions of thin films; any single layer must be densified before deposition of the subsequent layer. An example of this kind of procedure is given in "Deposition of thick silica-titania SOL-GEL films on Si substrates" Syms et al., Journal of Non-Crystalline Solids, 170 (1994), pages 223–233. According to the literature by this way it is possible to prepare multilayer thick films. On the other hand, as stated in the cited paper, in order to obtain films of good mechanical and optical characteristics any single layer must have a thickness not higher than about 0.25 µm, so that the production of a film of thickness about 10 µm requires about 40 deposition and densification steps.

Thus, the production of large amounts of flat waveguides by the sol-gel route is still an open problem.

SUMMARY OF THE INVENTION

It is thus an object of the present invention to provide a sol-gel process for the preparation of thick glassy films of silicon oxide or based on silicon oxide, as well as to provide glassy supported films of thickness higher than 1 µm, preferably between 2 and 20 µm.

According to the present invention, these objects are obtained with a sol-gel process for the preparation of thick glassy films of silicon oxide or based on silicon oxide, comprising the steps of claim 1.

BRIEF DESCRIPTION OF DRAWINGS

The invention will be described in detail with reference to the accompanying drawings, in which.

DETAILED DESCRIPTION

Figure 1:
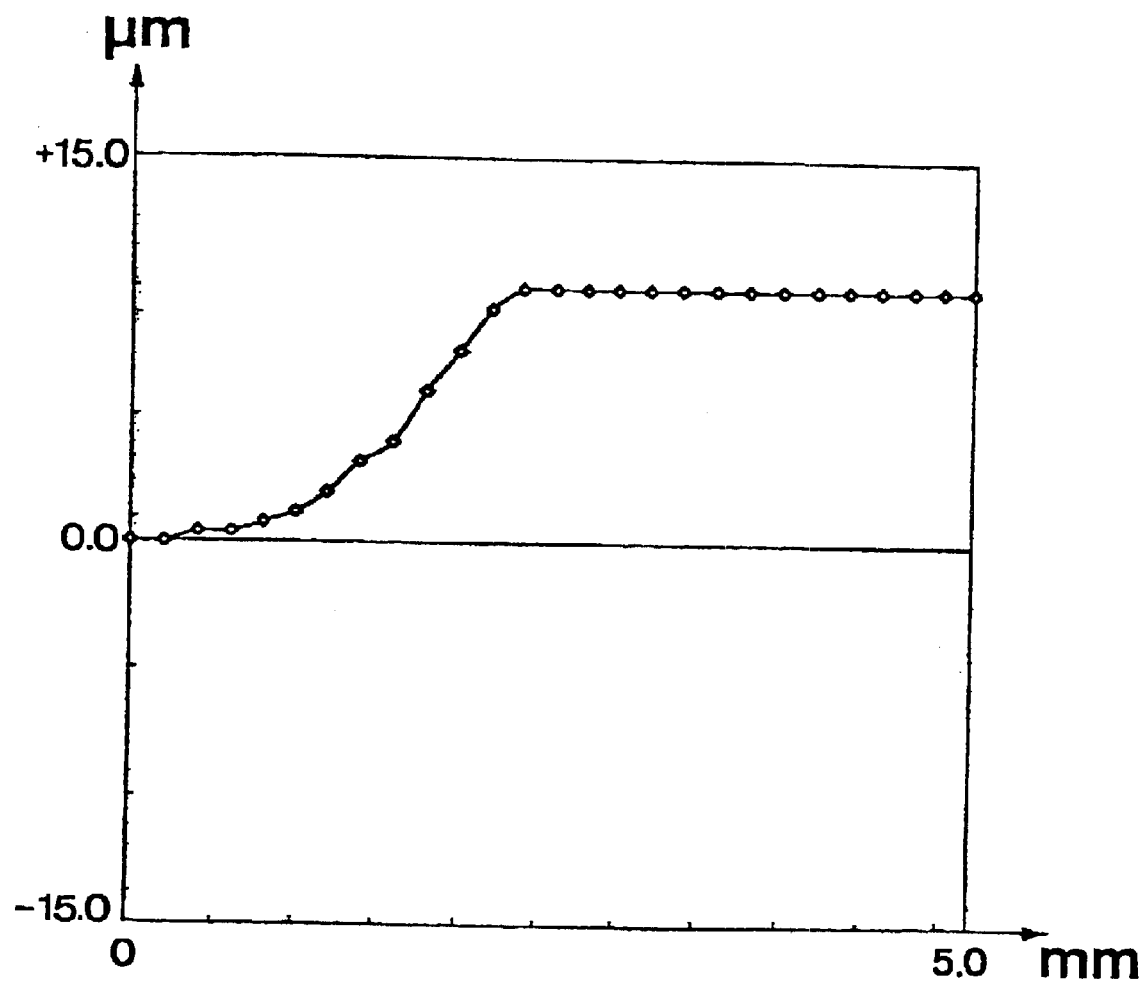
FIG. 1 shows the result of a profilometric test on a sample of the invention before the densification operation, showing sample thickness variations along a line that crosses the film edge.

In the first phase of the process according to the invention it is prepared an extremely diluted sol of a silicon alkoxide or of a mixture of alkoxides corresponding to the desired glassy composition. In mixed oxides, the molar ratio between silicon oxide and oxides of other elements may be 1:1 or higher in the case of germanium, while it is generally not lower than 5:1 when elements such as titanium, aluminium or boron are employed.

This sol is preferably of very low concentration and is obtained using at least 10 mols of $H_2O$ per mole of alkoxides, preferably from about 20 to about 100 mols of $H_2O$ per mole of alkoxides and more preferably from about 30 to about 40 mols of $H_2O$ per mole of alkoxides. Preferred alkoxides are those where the alcoholic moiety comes from methyl or ethyl alcohol, as these alkoxides are easily hydrolysed and the resulting alcohols may be easily removed by evaporation. Taking silicon as an example, silicon alkoxides may also be defined as silicic acid orthoesters, and are know in the field as TMOS, the acronym for Tetra-methyl-ortho-silicate, $Si(OCH_3)_4$, and TEOS, the acronym for Tetra-ethyl-ortho-silicate, $Si(OCH_2CH_3)_4$. $H_2O$ is added as a solution of an acid of concentration such as to yield a pH value comprised between 0.3 and 1.5. The preferred acid is HCl: in this case the acid concentration is comprised between 0.03 and 0.5N and preferably between 0.04 and 0.2N.

Alkoxides hydrolysis is an equilibrium reaction; a the invention process necessarily requires that hydrolysis at this stage be completed, and that no traces of alcohol remain in the subsequent phases, hydrolysis is pushed to its stoichiometric completion by distilling the forming alcohol. Distillation is generally performed under pumping, keeping the pressure in the hydrolysis container at a level below 10 mbar, and preferably comprised between and 5 mbar. This phase may be accelerated and favoured by operating at a temperature comprised between 30 and 40° C. Hydrolysis is stopped when the volume of alcohol recovered in a suitable flask is about 110% of the volume of alcohol stoichiometrically produced by alkoxides hydrolysis; recovering an over-stoichiometric volume one takes into account the amount of water that may evaporate along with alcohol as an azeotropic mixture, thus ensuring total alcohol removal.

To the thus obtained sol there are added from about 0.7 to 3 mols of $SiO_2$, preferably about 2 mols of $SiO_2$ per each starting silicon alkoxide mole. In the preferred embodiment of the invention, $SiO_2$ compound is in the form of extremely fine powders, such as the compound obtained by flame hydrolysis. $SiO_2$ by flame hydrolysis is a particular form of extremely pure, powdery silica, with particles of granulometry of about 10 nm, and it is produced feeding $SiC_4$ to an oxy-hydrogen flame. This product is commonly available on the market and may be obtained for instance by Degussa under the tradename Aerosil OX-50™. Homogeneous dispersion of flame hydrolysis $SiO_2$ into the sol may be favoured by mechanical or ultrasonic stirring.

The thus obtained sol is deposited on a substrate according to known techniques, e.g. by means of dip-coating or spin-coating, the first one consisting in dipping in and extracting from the sol, at a constant pre-set speed, the substrate kept in vertical position, and the second one in pouring a pre-set amount of sol on the substrate while spinning this latter, at a speed generally comprised between 500 and 5000 rpm.

The sol films thus obtained on the substrate are preferably caused to gel suddenly through quick solvent evaporation. Gelation consists in the condensation of —OH groups bonded to different atoms of silicon or of other possibly present elements, according to reaction (I) given above. Oxygen bridges between two atoms of metal, silicon or germanium are formed, eventually resulting in the formation of an oxidic gel.

Instantaneous gelation is obtained in the simplest way by sudden heating of the film from room temperature at a temperature of about 300–400° C., for instance introducing the substrate with the film into a pre-heated oven. The film may then be left in the oven for a few minutes, to enhance its mechanical strength. Once extracted from the oven, the film is stable and can be left exposed to air indefinitely. This film is constituted by a dry gel, having the same chemical composition of the final oxide, but with a porous structure.

The last process phase consists in densification of the film, that is realised in subsequent thermal treatment steps.

As known in the field, the dry porous gel obtained is generally subjected, as a first preparation step of the densification procedure, to a thermal treatment in oxidising atmosphere for instance between 300° C. and 1000° C., preferably between 500° C. and 800° C. in air or oxygen, in order to remove through combustion the remaining traces of organic compounds, alcohol or alcoholic moieties, that can have been left in the gel pores.

A subsequent step consists in a film dehydration or purification treatment, in order to remove the —OH groups possibly remaining in the film after gelation, solvent evaporation and combustion removal of organic moieties. In a first embodiment of the process of the invention this is obtained by flowing in the gel pores gaseous dry dehydrating agent, such as HCl possibly diluted in an inert gas. Alternatively, the same procedure is realised by using HCl diluted in $H_2$ in the inert gas.

Once the pre-set temperature in the above said range is reached, substrate and film are kept at such a temperature for a given time, generally comprised between 10 minutes and 1 hour in the presence of a dehydrating atmosphere.

Before realising the final densification phase, substrate and film are heated at a temperature comprised between 400° C. and 1000° C., preferably between 500° C. and 800° C., in a flowing inert gas, such as 99.99% pure helium, to wash the film.

The densification phase then involves heating substrate and sample in a flowing inert gas. Specifically, substrate and film are brought to temperatures comprised between 1200° C. and 1400° C. in a 99.99% pure helium during a time preferably comprised between about 10 and about 30 minutes.

This process is fully compatible with silicon oxide substrates. When the substrate is made of silicon, using HCl mixtures in helium may give rise to microerosions, known in the field as "pittings", on the same substrate surface. To avoid this, it is possible to resort to mixtures where the inert gas contains hydrogen along with HCl, with a acid/hydrogen ratio that varies depending on the treatment temperature, according to the conditions indicated in a paper of G. A. Lang, published on RCA Review of 1963, Vol. 24, page 448. This paper shows that the volume percent of HCl that may be present admixed with hydrogen without giving raise to pitting becomes higher the higher the temperature: as an example, pitting may be avoided with mixtures containing a HCl volume up to about 1.5% of the volume of hydrogen working at about 1200° C.; up to about 3% at about 1240° C.; and up to about 5% at about 1270° C.

Objectives and advantages of the present invention will be better appreciated by the experts in the field by reading the following examples, that are meant to illustrate the invention but by no means are to be considered as limiting its scope. In the Examples from 1 to 5, the preparation and check of a silicon oxide film on a substrate according to the invention is shown, while in Example 6 it is shown the preparation of a film by using a starting sol of different composition.

EXAMPLE 1

Preparation of a Porous Film on a Substrate 50 grams of TEOS are added to 150 cc of HCl solution 0.1N in a flask. The thus obtained solution is made homogeneous subjecting it to simultaneous mechanical and ultrasonic stirring during about 10 minutes. A clear monophasic solution is obtained. The solution is heated at 40° C.; after 1–2 minutes, extraction of ethyl alcohol formed by TEOS hydrolysis is begun, maintaining the sol at a temperature of 20° C. in the flask connected, through a Rotavapor®, to a pump that brings the pressure in the reaction flask to about 5 mbar. The condensing pipe of the Rotavapor® is kept at a temperature of about −20° C. to ensure complete condensation of the formed alcohol. The pump is disconnected from the system when in the collecting flask there are measured about 56 cc of liquid, essentially consisting of ethyl alcohol. 28.8 grams of Aerosil OX-50™ Degussa are added to the thus obtained sol, and the mixture is made homogeneous by ultrasonic stirring during 10 minutes. By using the thus obtained sol, some films are prepared through the dip-coating technique, dipping and extracting from the sol a silicon substrate at a speed of 0.5 cm per second. The sol film is instantaneously gelled placing it into an oven preheated at 400° C. and keeping it in the oven for about 10 minutes. On this film, not yet densified, a profilometric test is carried out by using a Rodenstock™ RM 600 profilometer. This technique allows performance of non-destructive tests to investigate a surface profile; tests may either be performed along one single line, obtaining the surface heights variations along the chosen line, or scanning the surface along parallel lines, thus obtaining the surface heights variations of the whole surface. In the present example a singe-line mode profilometric test has been performed. The result is shown in FIG. 1, reporting film thickness in micron on the vertical axis and displacement in millimeters on the film plane on the horizontal axis. The horizontal axis zero value corresponds to the borer of the zone reached by the sol during dipping of the substrate in the same sol. The resulting film thickness, apart from the edge zone, is of about 10 μm.

EXAMPLE 2

Porous Film Densification

The sample prepared as given in Example 1 is cleaned from traces of possibly remaining organic compounds and densified according to the following thermal treatment:

heating from room temperature to 800° C. in helium at a heating rate of 4° C. per minute;

treatment in a 10% anhydrous HCl-90% helium mixture during half an hour at 800° C.;

heating in helium up to 1370° C. at a heating rate of 4° C. per minute;

rapid cooling, taking about 6 hours, down to room temperature.

Figure 2:
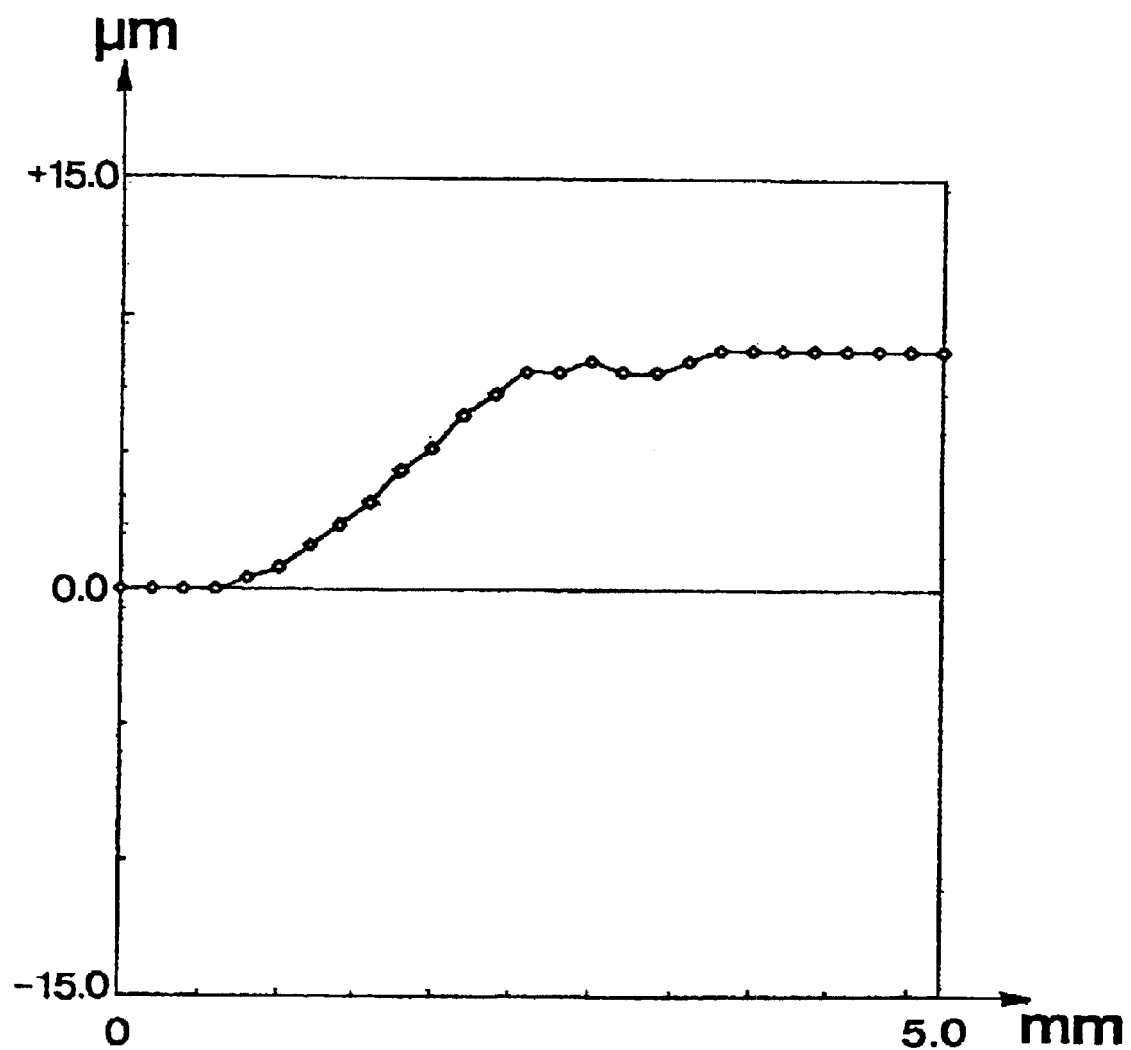
FIG. 2 shows the result of a profilometric test on the same sample of FIG. 1 after densification.

A profilometric tests similar to the one previously described is carried out on the thus densified film. The test result is represented in FIG. 2, similar to FIG. 1, and shows a film thickness of about 8 µm.

EXAMPLE 3

Substrate and Film Check

Figure 3:
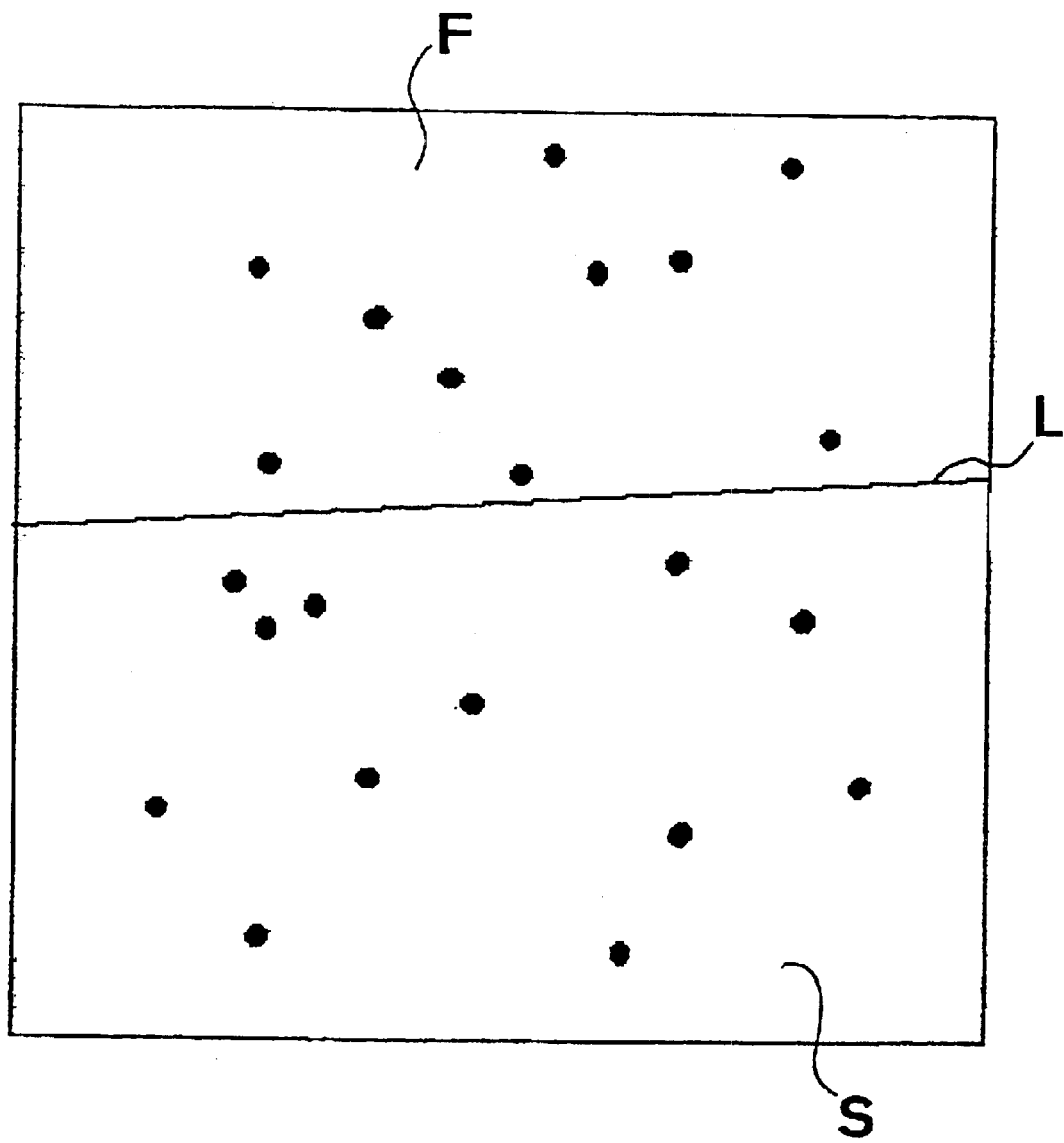
FIG. 3 is a schematic view of a sample of the invention, obtained according to the interferometric technique in order to put in evidence possible defects of substrate-film interface.

The dense film sample obtained in Example 2 is inspected with an interferometric microscope (Zeiss, Mod. AXIOVERT™). The results are shown in FIG. 3: focusing the microscope at the interface between the perfectly transparent film and the silicon substrate, black spots corresponding to silicon surface defects are noted. The image in FIG. 3 shows a line, L, representing the edge of film F on substrate S: the silicon oxide film lays on the upper part of the image.

EXAMPLE 4

Film Check

Figure 4:
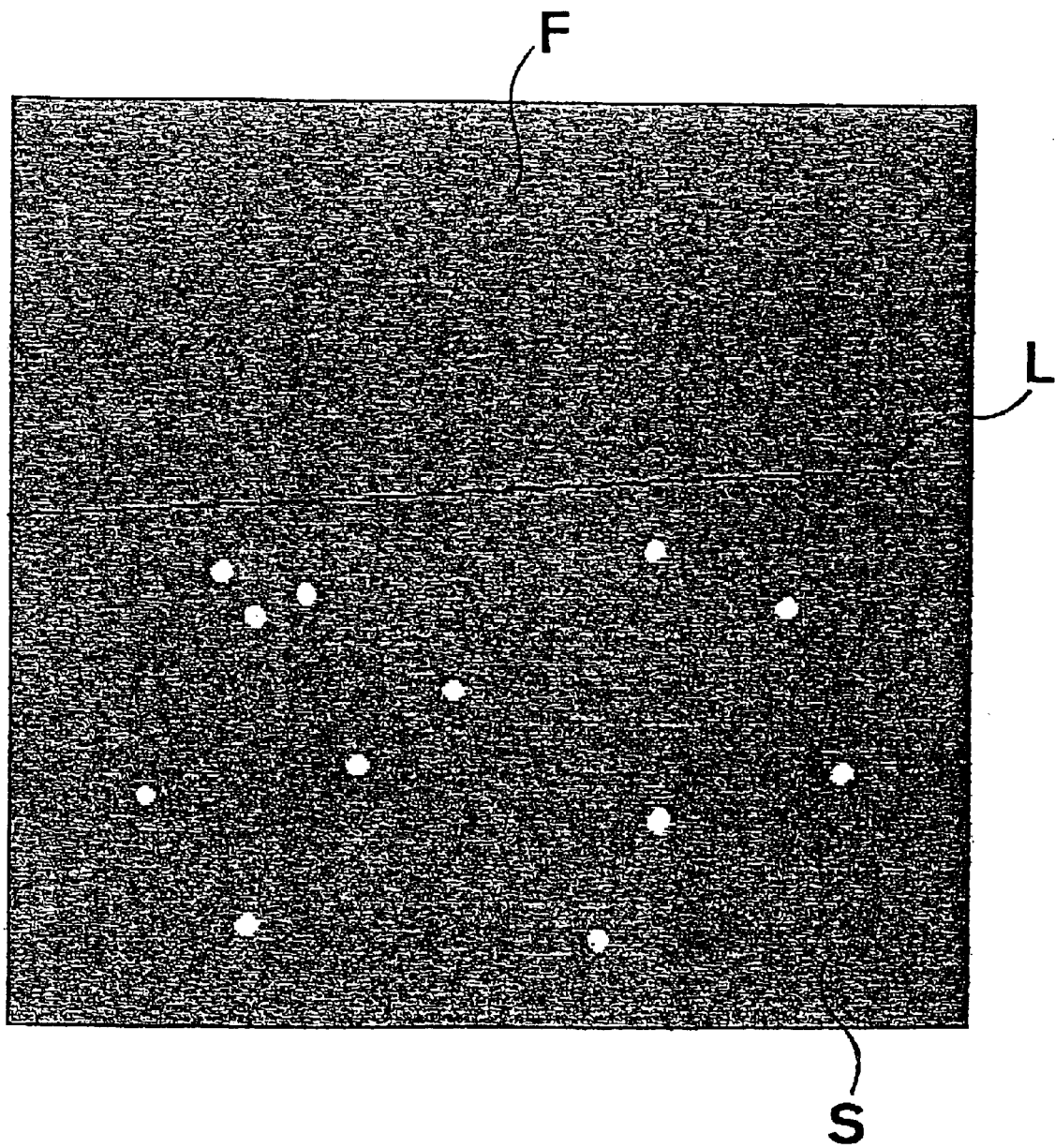
FIG. 4 shows another image of the same sample and with the same view of FIG. 3, with the only difference that the image in FIG. 4 has been obtained according to the "dark field" technique, as explained below.

The same sample of Example 3 is now inspected in "dark field", using the same view direction and the same Zeiss AXIOVERT™ microscope. The "dark field" technique consists in lighting the sample with light directed towards the centre of the viewing field and with an incidence degree on the sample of about 45°. In these conditions, if sample surface has no defects, light is of reflected in the observation direction and the sample looks black; vice versa, if the sample has defects, these diffuse light in any directions, comprising the observation direction, so that the appearance of shining spots or areas in the microscope field reveals non-perfectly planar surface. The results of this inspection are shown in FIG. 4. It can thus be noted that defects are present on the substrate S alone, while film F, corresponding to a zone with no bright spots or zones, results completely free of defects.

EXAMPLE 5

Thick Films Production With no Substrate Defects Generation

A sample obtained according to the procedure of Example 1 is densified according to the following thermal treatment:

heating from room temperature to 800° C. in oxygen at an heating rate of 4° C. a minute;

treating at 800° C. with a gaseous mixture containing one mole of HCl per 100 mols of $H_2$ per 2500 mols of inert gas, such as $N_2$ or He;

heating in helium up to 1370° C. at an heating rate of 4° C. a minute.

By inspecting the thus obtained sample with the microscope, according to both the "clear field" and "dark field" techniques, no defects are detected.

COMPARATIVE EXAMPLE 6

The procedures of Examples 1 and 2 are repeated, with the only difference that the HCl concentration for preparing the starting sol is lowered at 0.01N. The result is a broken film showing poor adhesion onto the substrate.

The analysis of tests results shows that the process of the invention allows the obtainment of thick supported films. In particular, FIG. 2 shows that by the invention process film about 8 µm thick has been obtained having side dimensions of several millimeters. FIGS. 3 and 4 show that, although the substrate surface presents a few point defects (black spots in FIG. 3) he oxidic film formed according to the invention process has an upper surface with no defects (lack of bright spots in the upper part of the image in FIG. 4, corresponding to the zone where the film is). In this image, defects at the film-substrate interface, that is, under the film, are no longer visible, because in the "dark field" technique this interface is no longer lighted up being shielded by the mirror plane represented by the intact film. Silicon surface defects are avoided if, in the last part of the densification process, a HCl-hydrogen mixture in inert gas instead of HCl alone in inert gas is used, as explained in the cited paper of G. A. Lang and as shown in Example 5. Films obtained according to the process of the invention are hence endowed with good optical surfaces, allowing their use in optics.

Finally, despite the fact that the sol-gel technique has been known and investigated for a number of years, and despite the fact that the single steps of the present process of the invention may have previously described in the specialised literature, the process of the invention allows the obtainment of the above exposed results, that could not be obtained before by the experts in the sol-gel field.

What is claimed is:

1. A substrate having a vitreous film deposited thereon, said vitreous film having a thickness greater than 1 µm and said substrate being obtained according to the process comprising:
    a) preparing a solution or a suspension having a pH ranging from 0.3 to 1.5, comprising at least one silicon alkoxide in water, alcohol or hydroalcoholic mixtures, wherein the solution or the suspension comprises at least 10 moles of water per mole of silicon alkoxide
    b) hydrolyzing the silicon alkoxide to form a sol;
    c) adding to the sol about 0.7 moles to about 3.0 moles of silicon oxide per mole of silicon alkoxide;
    d) depositing the sol on said substrate to form a sol film on said substrate;
    e) gelling the sol film through solvent evaporation, wherein the gelling is initiated by introducing the sol film on the substrate into an oven preheated at a temperature from 300° C. to 400° C.; and
    f) densifying said gel film through thermal treatment to form a vitreous film on said substrate.

2. The substrate having a vitreous film deposited thereon according to claim 1, wherein the process further comprises adding to said solution or suspension at least one element selected from the group consisting of germanium, aluminum, titanium, and zirconium, wherein the molar ratio of the silicon alkoxide to the at least one element is greater than or equal to 1:1.

3. The substrate having a vitreous film deposited thereon according to claim 1, wherein said vitreous film further comprises another element selected from the group consisting of germanium, aluminum, titanium and zirconium and wherein the molar ratio of the silicon alkoxide to the another element is greater than or equal to 1:1.

4. A sol composition comprising:
    a) a solution or a suspension comprising at least one silicon alkoxide in water, alcohol or hydroalcoholic mixtures, wherein the solution or the suspension comprises at least 10 moles of water per mole of silicon alkoxide; and b) an acid having a concentration between 0.3 N and 0.5 N, such that the sol has a pH value between 0.3 and 1.5.

5. The sol composition according to claim 4, further comprising at least one element selected from the group consisting of germanium, aluminum, titanium, and zirconium, wherein the molar ratio of the precursor to the at least one element is greater than or equal to 1:1.

6. A sol composition comprising:
  a) a solution or a suspension comprising at least one silicon alkoxide in water, alcohol or hydroalcoholic mixtures, wherein the silicon alkoxide further comprises at least 0.7 mole to 3.0 moles of $SiO_2$ per mole of silicon alkoxide and the $SiO_2$ is hydrolyzed;
  b) at least 10 moles of $H_2O$ per mole of $SiO_2$; and
  c) an acid having a concentration between 0.03 N and 0.5 N, such that the sol has a pH value between 0.3 and 1.5.

7. The sol composition according to claim 6, further comprising at least one element selected from the group consisting of germanium, aluminum, titanium, and zirconium, wherein the molar ratio of the precursor to the at least one element is greater than or equal to 1:1.

8. The sol composition according to claim 6, wherein the $SiO_2$ is in a fine powder condition.

9. A silica substrate having a vitreous film deposited thereon, said vitreous film having a thickness greater than 1 μm and said substrate being obtained according to the process comprising:
  a) preparing a solution or a suspension having a pH ranging from 0.3 to 1.5, comprising at least one silicon alkoxide in water, alcohol or hydroalcoholic mixtures, wherein the solution or the suspension comprises at least 10 moles of water per mole of silicon alkoxide
  b) hydrolyzing the silicon alkoxide to form a sol;
  c) adding to the sol about 0.7 moles to about 3.0 moles of silicon oxide per mole of silicon alkoxide;
  d) depositing the sol on said substrate to form a sol film on said substrate;
  e) gelling the sol film through solvent evaporation, wherein the gelling is initiated by introducing the sol film on the substrate into an oven preheated at a temperature from 300° C. to 400° C.; and
  f) densifying said gel film through thermal treatment to form a vitreous film on said substrate.

10. A substrate having a vitreous film deposited thereon, said vitreous film having a thickness greater than 1 μm and said substrate being obtained according to the process comprising:
  a) preparing a solution or a suspension having a pH ranging from 0.3 to 1.5, comprising at least one alkoxide in water, alcohol or hydroalcoholic mixtures, wherein the solution or the suspension comprises at least 10 moles of water per mole of alkoxide, where said alkoxide has the formula M(OR)n and M represents the element whose oxide is desired, OR is the alkoxide moiety and n represents the valence of element M,
  b) hydrolyzing the alkoxide to form a sol;
  c) adding to the sol about 0.7 moles to about 3.0 moles of silicon oxide per mole of silicon alkoxide;
  d) depositing the sol on said substrate to form a sol film on said substrate;
  e) gelling the sol film through solvent evaporation, wherein the gelling is initiated by introducing the sol film on the substrate into an oven preheated at a temperature from 300° C. to 400° C.; and
  f) densifying said gel film through thermal treatment to form a vitreous film on said substrate.

11. The substrate according to claim 10, wherein R is methyl or ethyl.

12. A substrate having a vitreous film deposited thereon, said vitreous film having a thickness greater than 1 μm and said substrate being obtained according to the process comprising:
  a) preparing a solution or a suspension having a pH ranging from 0.3 to 1.5, comprising at least one soluble salt of the element M in water, alcohol or hydroalcoholic mixtures, wherein the solution or the suspension comprises at least 10 moles of water per mole of soluble salt and wherein the soluble salt is a chloride, nitrate or oxide of M,
  b) hydrolyzing the soluble sale to form a sol;
  c) adding to the sol about 0.7 moles to about 3.0 moles of silicon oxide per mole of soluble salt;
  d) depositing the sol on said substrate to form a sol film on said substrate;
  e) gelling the sol film through solvent evaporation, wherein the gelling is initiated by introducing the sol film on the substrate into an oven preheated at a temperature from 300° C. to 400° C.; and
  f) densifying said gel film through thermal treatment to form a vitreous film on said substrate.

* * * * *